(No Model.) 4 Sheets—Sheet 1.
P. B. DELANY.
DUPLEX TELEGRAPHY.
No. 286,279. Patented Oct. 9, 1883.
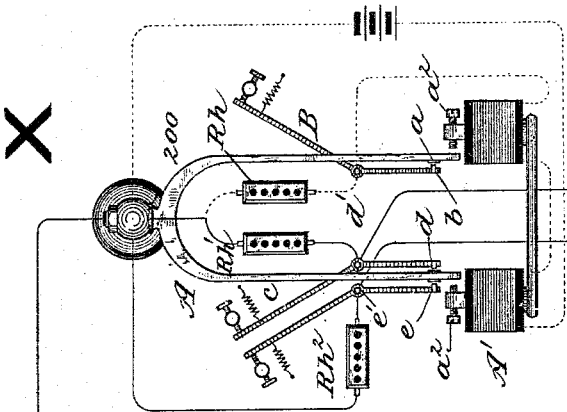
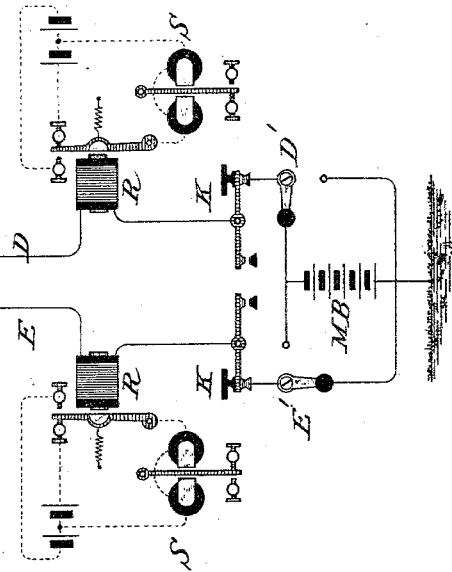
Fig. 1.
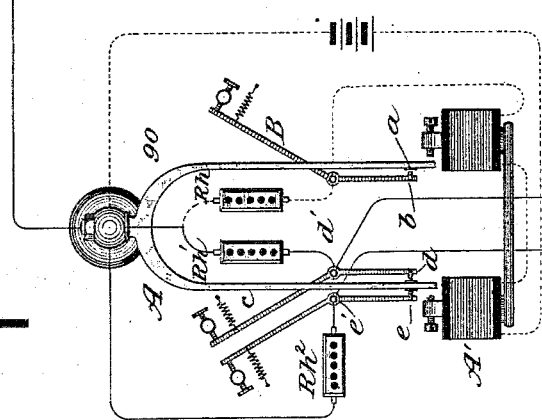
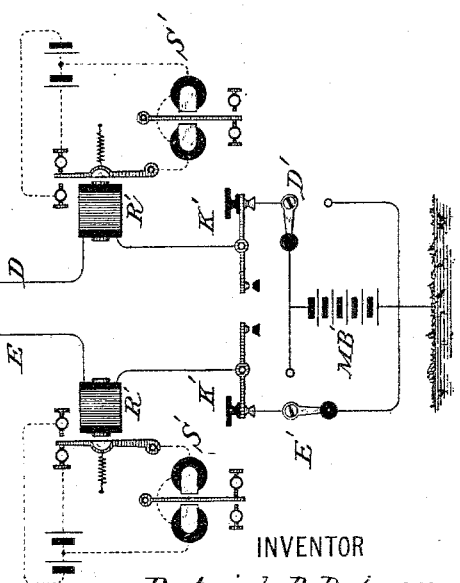
WITNESSES
Wm. A. Skinkle
Francis D. Shoemaker
INVENTOR
Patrick B. Delany
By his Attorneys.
Baldwin Hopkins & Peyton (No Model.)  4 Sheets—Sheet 3.

P. B. DELANY.
DUPLEX TELEGRAPHY.

No. 286,279.  Patented Oct. 9, 1883.

WITNESSES
Wm A. Skinkle
Francis D. Shoemaker

INVENTOR
Patrick B. Delany
By his Attorneys
Baldwin Hopkins & Peyton (No Model.)　　　　　　　　　　　　　　　　　　　　4 Sheets—Sheet 4.
P. B. DELANY.
DUPLEX TELEGRAPHY.
No. 286,279.　　　　　　　　　　　　　　　Patented Oct. 9, 1883.
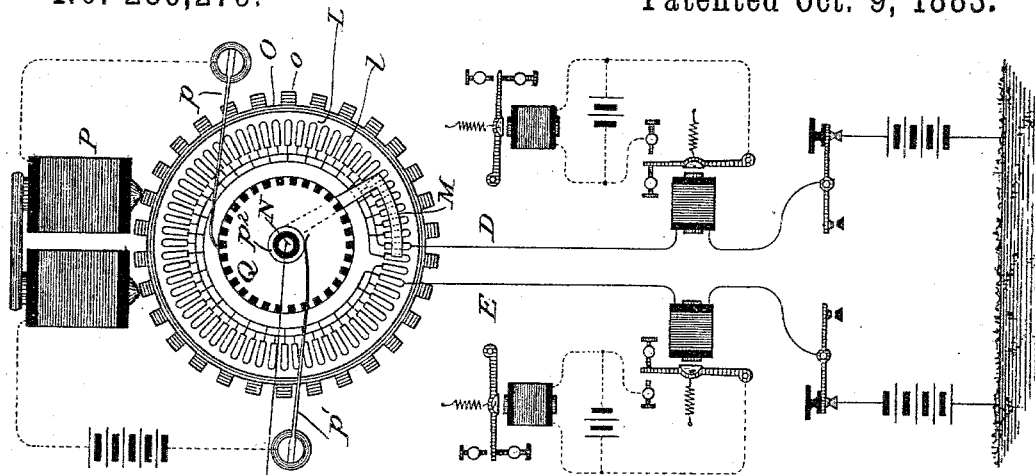
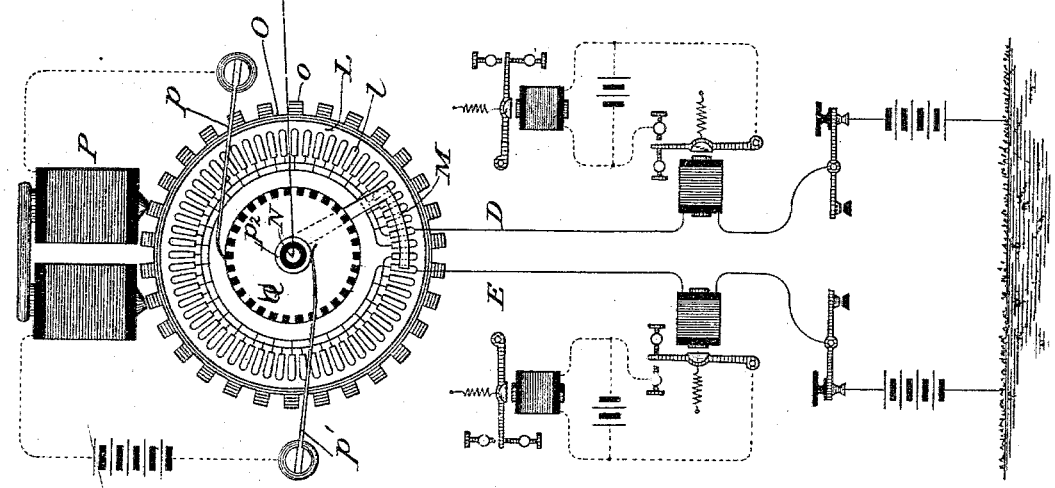
*Fig. 4.*
WITNESSES　　　　　　　　　　　　　　　　　　INVENTOR
Wm. A. Skinkle　　　　　　　　　　　　　　　Patrick B. Delany.
Francis D. Shoemaker.　　　　　By his Attorneys
　　　　　　　　　　　　　　　Baldwin Hopkins & Peyton
N. PETERS, Photo-Lithographer, Washington, D. C.

UNITED STATES PATENT OFFICE.

PATRICK B. DELANY, OF NEW YORK, N. Y., ASSIGNOR TO THE STANDARD ELECTRIC MANUFACTURING COMPANY, OF SAME PLACE.

DUPLEX TELEGRAPHY.

SPECIFICATION forming part of Letters Patent No. 286,279, dated October 9, 1883.

Application filed April 14, 1883. (No model.)

*To all whom it may concern:*

Be it known that I, PATRICK B. DELANY, a citizen of the United States, residing in the city, county, and State of New York, have invented certain new and useful Improvements in Duplex Telegraphy, of which the following is a specification.

The various systems of duplex telegraphy in practical use, in which two messages may be sent in the same direction as well as in opposite directions, depend, for successful operation, upon a system of balanced circuits involving bridges and resistances, as well as a necessary complication of circuits and apparatus. Such organizations are liable to be thrown out of adjustment by variations in the static condition of the line, and for other reasons, and the lines have to be repeatedly rebalanced or readjusted.

The object of my invention is to produce a system of the greatest simplicity which will not be open to the objections which are found to be incident to those systems involving balanced circuits, bridges, &c. Under my improved organization the line is not liable to be disturbed by ordinary static effects, and the operation is not dependent upon any system of balanced or artificial lines, upon any special division of the current, or upon any delicate or even approximately delicate adjustment of apparatus. Messages may be sent in opposite directions with perfect facility and accuracy, and where two messages are simultaneously transmitted in the same direction the operation of the system is as complete and perfect as if each operator were working upon an independent line.

Figure 2:
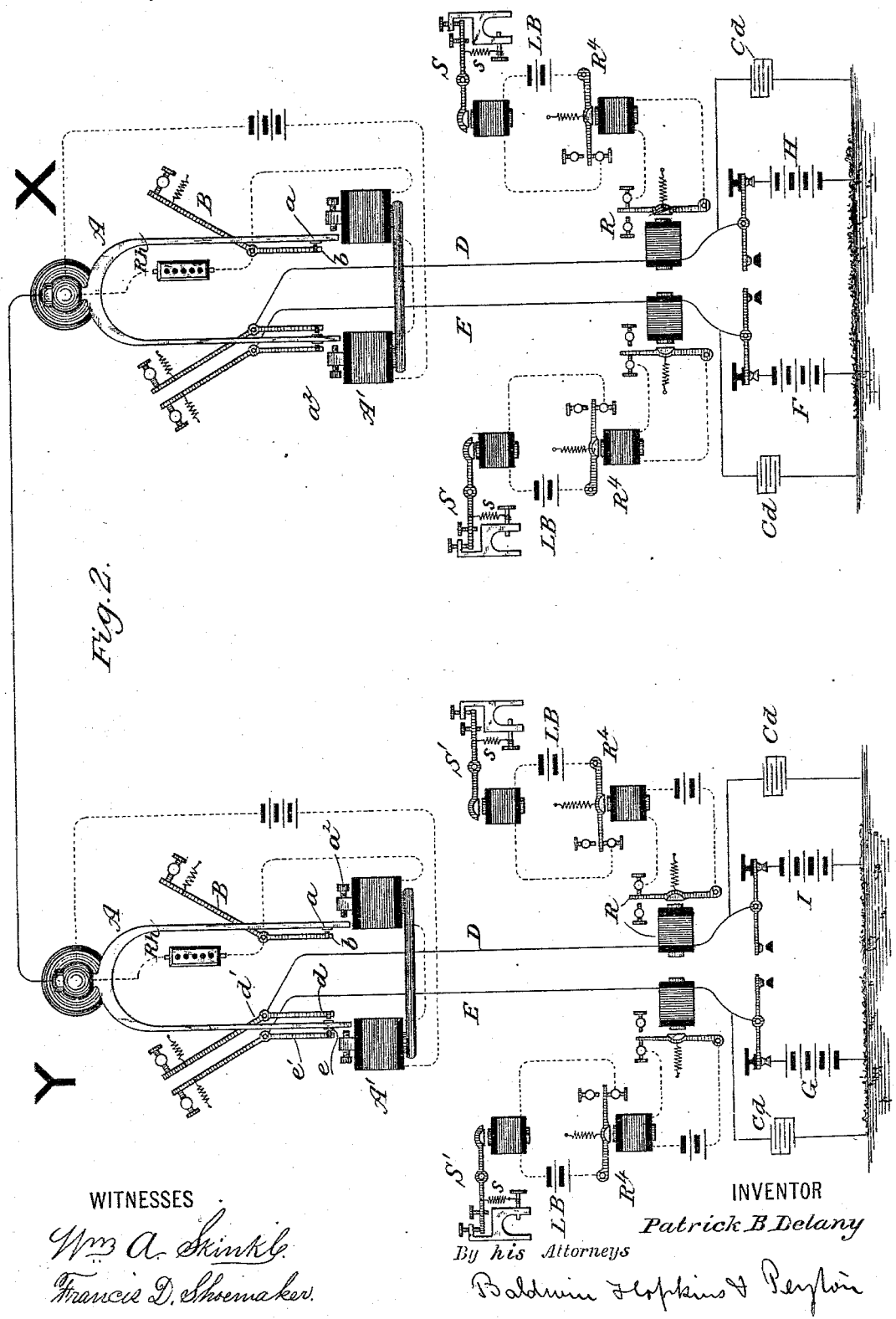
Figure 3:
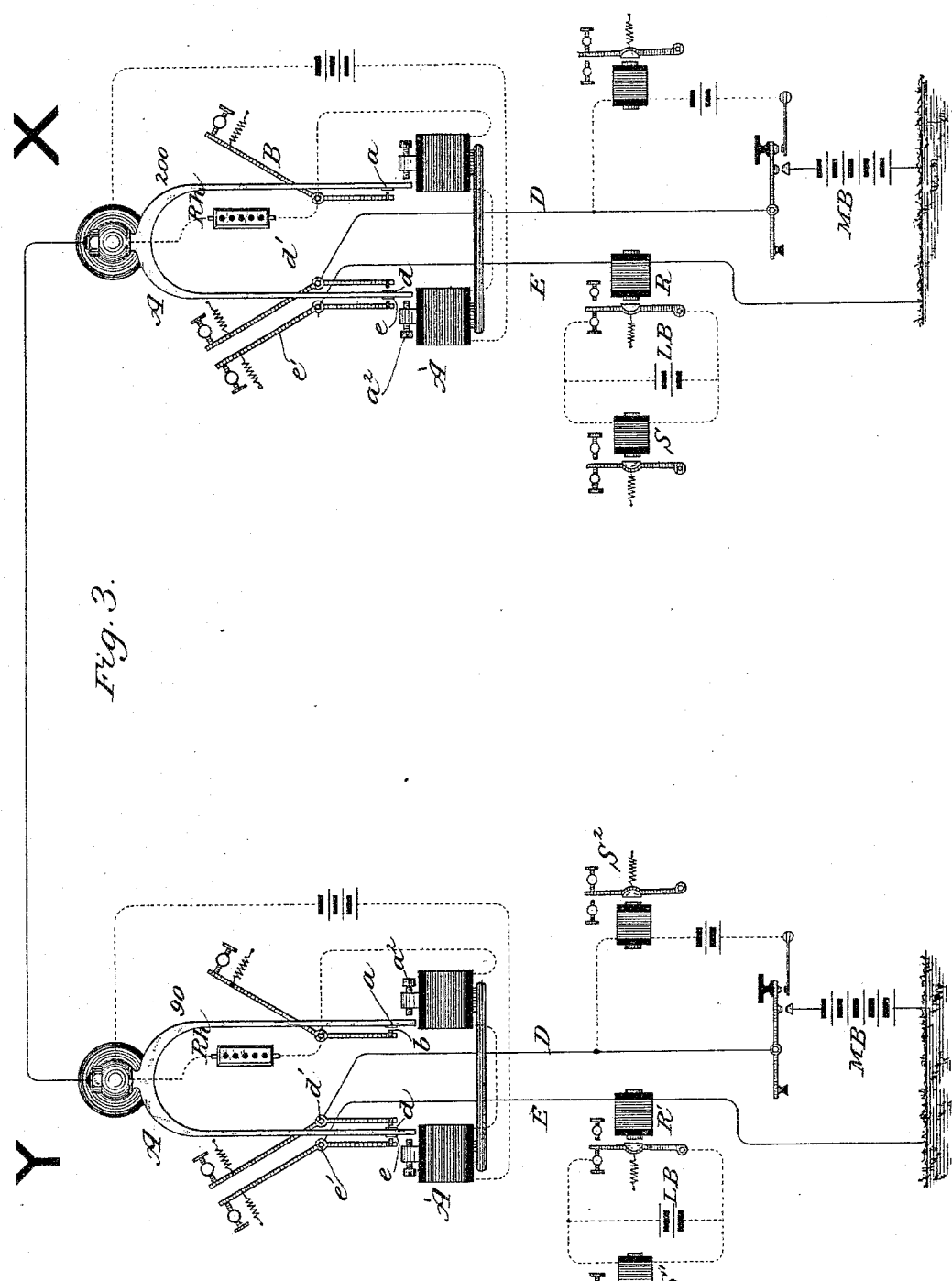

In the accompanying drawings, Figure 1 is a diagrammatic plan view illustrating organizations at two stations connected by a main line. Fig. 2 is a similar view of a slightly different organization. Fig. 3 is a similar view of another organization, and Fig. 4 is a similar view of another organization.

In all of the arrangements illustrated the operation of the apparatus depends upon the same general principle, which I will now describe.

I make use at each station of a continuously rapidly operated circuit-breaker, which circuit-breakers are shown in the various drawings as actuated by means of a local circuit, with a battery and magnet included therein. Obviously, however, any manner of actuating the circuit-breakers at the necessary speed may be employed.

In Figs. 1, 2, and 3 I have shown vibratory circuit-breakers, and in Fig. 4 rotary circuit-breakers; but, as will appear hereinafter, a circuit-breaker of any character may be employed. I prefer tuned forks, however, because they possess definite normal rates of vibration and may be adjusted with facility.

In Figs. 1, 2, and 3 at each station a tuned fork, A, mounted in a suitable support, is vibrated automatically and continuously by a magnet, A', included in a local battery-circuit. (Indicated by the dotted lines.) This circuit is made and broken between the platinum contact $a$ on the inside of one of the tines of the fork and a delicate spring contact-finger, $b$, on a pivoted insulated lever, B, which is adjusted by means of a thumb-screw, against which it is normally drawn by a spring. The magnet A' is provided with adjustable or screw-extension pole-pieces $a^2$, which may be approached to or withdrawn from the tines of the fork to regulate, in a measure, its rate of vibration, if necessary. The main line is electrically connected with the vibrators or forks at each station. The tine $c$ of the fork is provided on its opposite faces with platinum contact-pieces $d$ $e$, which alternately make contact with delicate platinum contact-springs carried on pivoted insulated levers $e'$ $d'$. These levers may be adjusted in the same manner as the lever first described. A line, E, in which telegraphic apparatus is placed, runs from the lever $e'$ to the ground, and a similar line, D, from the lever $d'$.

In Figs. 1, 2, and 4 I have shown each of the lines D and E equipped with independent transmitting and receiving apparatus, while in Fig. 3 the line E is provided with receiving apparatus only, and the line D with transmitting apparatus.

Resistances Rh Rh' Rh², placed in shunts around the contacts $a$ $b$, $d$ and its contact-spring, and e and its contact-spring, to prevent sparking, may be employed, as shown in Fig. 1; but they are not necessary parts and are omitted in the other figures.

The forks at two connected stations are of different pitches, and their normal rates of vibration are preferably very unequal. The fork at one station may vibrate two hundred times per second, and the fork at the other station eighty, ninety, or one hundred times per second; or the difference in the rates of vibration may be greater than this, or less, without affecting the perfection of the operation. The rates of vibration may, as above mentioned, be adjusted within limits, if occasion requires, by means of the adjustable pole-pieces on the vibrator-magnet or other means. The proper rates of vibration of the forks should, however, depend upon their normal rates and not upon adjustment or modification of those rates, because it is desirable that the vibrations should be wide and strong, so that the completions of the branch circuits may be entirely clear and independent of each other, as obviously the best results can be obtained in that way.

Referring, now, especially to Fig. 3, which shows a relay in the line E at each station, and a key and battery in the line D, if the forks at the two stations are started into vibration—say the fork at station X—at the rate of two hundred per second, and that at station Y at the rate of ninety per second, when the key at station X is put down, electrical impulses from the battery M B will be sent into the line through the contact d and fork at the rate of two hundred per second. These impulses, which represent a practically-continuous current, arriving at station Y, where the fork is vibrating at the rate of ninety per second, pass into the line E from the contact e, (the circuit from the line E being completed ninety times per second,) and operate the relay R' and sounder S' in a manner hereinafter described. Of course, if the key at station Y is open, the line D will be broken, and no impulses of electricity will pass over this line from the contact d.

If a message is being simultaneously transmitted from station Y to X, the operation is as follows: If, at the moment when at station X the key is depressed and the transmitting-battery M B is put to line through the branch circuit D and the contact d, the line D at station Y is also put in connection with the main line at the contact d, the operation is as follows: If the key at Y is open, the line D is broken at that station, and of course no effect is produced. If the key is closed, however, the transmitting-battery at Y merely opposes the transmitting-battery at X, these batteries being arranged with like poles to the line, and of course no effect is produced in the sounders S² in the lines D at both stations. If, however, while the key at station Y is depressed and the line D connected with the main line through the contact d, the line E is connected with the main line through the contact e at station Y, there will be a complete circuit from the key at X to the relay in the line E at station Y. So, if the key at station Y is depressed and the line D at that station placed in communication with the main line, and the line E at station X thrown into communication with the main line through the contact e, there will be a complete battery-circuit from the key at station Y to the relay in the line E at station X. When the lines E are momentarily simultaneously placed in communication with the main line through the contacts e at each station, no effect, of course, is produced, and where the lines D at each station are momentarily simultaneously connected with the main line, the batteries at each station are opposed, and no effect is produced; but as the circuit-interrupters act very rapidly and at different speeds, as described, there is always a sufficient number of communications per second between the key at one station and the relay at the other to give practically independent circuits from the transmitter at one station to the receiver at the other. The current on these circuits is made up of impulses of electricity, which are thrown upon the line with such rapidity as to give, for working purposes, a practically-continuous current for each pair of operators. The difference in the rates of vibration of the forks at the two stations is such that no coincidence of vibration which would, unless the vibrations were in the same direction, interrupt communication between the operators at the two stations can last long enough to disturb the circuits.

As the currents received through the relays are made up of fine vibrations or impulses, it is desirable to employ some means of preventing the chattering of the sounder. I have shown in this application three methods for accomplishing that purpose.

In Fig. 3 the receiving-sounder at each station is worked by a local battery, L B, which is shunted from the sounder-coil through the armature of the relay R R' when the armature is against its back stop, as clearly illustrated in the drawings. It will be obvious that by such an arrangement the moment the relay-armature is drawn from its back stop the local battery will operate the sounder, and any vibration or chattering of the relay-armature on its front stop will not affect the sounder, because the circuit through the sounder can never be broken until the main line is open a sufficient length of time to permit the relay-armature to go over against its back stop and shunt the local battery. This method of working a sounder, broadly, is claimed in another application filed simultaneously herewith, and is only intended to be covered in this case in connection with the general organization herein shown.

In Fig. 1 I have shown a relay and sounder and key in each of the circuits E D at each station. These lines at each station may therefore either be used for transmission or reception, as may be convenient or desirable for any reason. The line may be completed through the batteries M B and M B', or put to ground through the keys K K and K' K', as may be desired, by means of ordinary switches, E' D', at each station. In this figure I have illustrated another means of preventing chattering on the sounder. The sounders S S and S' S' are worked by split local batteries L B, in each case the line from the middle of the local battery passing through the coils of a polarized sounder, and thence to the relay-armature, while the line from one pole of the battery is connected with the front stop, and the line from the opposite pole with the back stop, of that armature. The sounder therefore only responds when the polarity of the local-battery current is reversed by the relay-armature passing from one stop to the other. Any mere vibration or chattering of the relay-armature on either of the stops will not affect the sounder sufficiently to move its armature. The operation of the polarized armature is so well understood that further description is unnecessary. In the organization shown in this figure, as well as that in Fig. 3, whether a message is being transmitted from one end only or messages in opposite directions from each end, the circuit will always be completed a sufficient number of times per second, through the contacts $d$ or $e$ at each station, from the key at one station to the relay at the other, and vice versa, to give a practical operating-circuit between each pair of operators.

In Fig. 2 I have shown still another means for preventing chattering on the sounder, and have also shown two main batteries at each station—one connected through the transmitting-key with each of the lines E D. The two batteries at each station are arranged with opposite poles to the line—that is, at station X the battery F, connected with the line E, has its negative pole to the line, while the battery G, connected with the line E at station Y, has its positive pole to the line. The battery H in the line D at station X has its positive pole to the line, and the battery I in the line D at station Y has its negative pole to the line. Under this organization it will be obvious that the apparatus may be worked duplex—that is, two passages may be transmitted simultaneously in the same direction; or two messages may be sent in opposite directions. When two messages are sent in the same direction, the operator connected to the battery F at station X will transmit to the operator connected to the battery G at station Y. The operation will be obvious. When the contacts are by the vibrating forks completed simultaneously over the main line and through the lines E E at each station, the batteries F and G will work together, whereas if, while the battery F is on the main line, and the fork at station Y makes contact through the line D, the batteries I and F will be opposed, and there will be no stroke on the sounder in the line D at station Y. Therefore the keys connected with the batteries F and H at station X may be simultaneously operated to transmit two messages in the same direction; or the keys connected with the batteries G and I may be simultaneously operated to transmit two messages from station Y to station X. The sounders in each case in the lines E and D at the receiving-station only act when the circuit through the unopposed batteries is completed, and these completions of the circuit, when the forks are vibrated at the speeds given, or at greater speeds, are always of sufficient number to give practical independent working-circuits to each pair of operators. Under the organization shown in this figure, in order to prevent chattering on the sounder, I employ a supplementary relay, $R^4$, at each station, interposed between the sounder and the relay R R. The vibrations of the armature of the relay R' on its back stop are not of sufficient amplitude to permit the armature of the relay $R^4$ to leave its front stop long enough for the sounder to operate. It will be observed, under the organization illustrated, that the circuit of the local battery L B of the sounder S S' is completed when the armature of the relay $R^4$ is drawn against its front stop. The sounder therefore gives a reading-stroke by the force of the spring $s$ when its local circuit is broken and is not operated by the pull of its magnet. The local circuit of the relay $R^4$ is completed when the armature of the relay R is against its back stop. The sounder S S' therefore gives a reading-stroke whenever an impulse of electricity is received from the line E D and the armature of the relay R R is attracted. This method of working the sounder by causing the downward reading-stroke to be given by the pull of a spring instead of the attraction of a magnet, broadly considered, is claimed in another application filed simultaneously herewith, and no specific claim is therefore made to it herein; nor is any claim made to the use, broadly, of an interposed relay and a sounder, as such an arrangement is old.

In Fig. 4 I have shown an arrangement of batteries identical with that illustrated in Fig. 2, just described; but the arrangement of relays and sounders is that illustrated in Fig. 3, where the sounder is cut out of its local circuit by shunting the battery. In the organization shown in Fig. 4, however, instead of employing a vibrating fork to alternately make and break the main-line circuit with each of the lines at each of the stations, I use an entirely different form of circuit-breaker. This apparatus consists of a circular table of contacts, L, on which a series of insulated contact-pieces, $l$, are arranged. The line D is connected, as illustrated, with the alternate contacts in the series, and the line E with the remaining interposed or alternate contacts. The main-line circuit is completed successively and alternately through the lines E and D by a trailing contact-finger or circuit-completer, M, electrically connected with and carried by a vertical rotating shaft, N, arranged in the center of the stationary table. This rotating shaft is in electrical connection with the main line, and is fast to an armature-disk, O, provided with a series of armature-teeth, o, and actuated by a motor-magnet, P, placed in the local motor battery-circuit. This motor-circuit is automatically made and broken by means of a break-wheel, Q, also carried on the vertical rotating shaft, the circuit being completed from the spring-arm p through the conducting-faces of the make-and-break wheel and the spring-arm p', which bears upon the hub $p^2$ on the rotating shaft, and in electrical contact with the make-and-break wheel. Of course, the motor may be set to run at any desired speed, and under this organization the apparatus at one station may be rotated two or three times, or more than that at the other station. The operation is identical with that heretofore described, and further description is therefore unnecessary.

As remarked at the beginning of this specification, any form of circuit-breaker may be employed, as will be obvious. Of course, if the apparatus shown in Fig. 4, as well as the forks shown in the other figures, were actuated synchronously in the proper direction at each station, the apparatus would be in condition for the transmission of messages; but my invention does not comprehend a synchronous system of telegraphy, but, on the contrary, is based on the unequal action of circuit-breakers at each of the stations. To obtain a synchronous movement of independently-vibrating forks would perhaps be impossible, and in any event a remarkable delicacy of operation and refinement of adjustment would be necessary. According to my present invention, however, there is a wide latitude of adjustment. It is not necessary that the fork at one station should vibrate so many times relatively to the fork at the other station; but, on the contrary, it is quite immaterial, within wide limits, what relation the rates of vibration bear to each other. So when the circuit-breaker is started to interrupt the circuit at one station at what is known approximately to be a certain number of interruptions per second—say one hundred—and the circuit-breaker at the other station is started into operation at a speed approximately two, three, or four times faster, the apparatus is in proper working condition, and, as a matter of fact, substantially no adjustment at all is necessary.

As before remarked, there is no balancing of the lines; but, on the contrary, the circuits momentarily and successively given to the operators at the two stations are separate and distinct.

If desirable, on long lines, where the static effect might interfere with the working of the lines, condensers C d may be employed, as illustrated in Fig. 1.

The right to hereafter file other applications for any matter herein described or illustrated but not fully claimed is reserved.

What I claim as my invention is—

1. The improvement in the art of multiple transmission, which consists in rapidly and independently making and breaking connection between the main line and the lines containing transmitting and receiving apparatus at the stations at unequal speeds, and then transmitting messages, as set forth, over such interrupted circuits.

2. The combination of a main line, the branch or transmitting and receiving lines at each station, and a circuit-breaker at each station, which automatically and successively makes and breaks the main-line circuit through each of the branch circuits, the circuit-breaker at one station acting to make and break the circuit more rapidly than that at the other station, for the purpose set forth.

3. The combination of a main line, the branch or transmitting and receiving lines at each end of the main line, telegraphic apparatus in said branch lines, and a circuit-breaker at each station interposed between the main line and branch lines, so as to successively and rapidly make and break the circuit with said lines, the circuit-breaker at one station acting to make and break the circuit more rapidly than that at the other station, for the purpose set forth.

4. The combination of a main line, branch or transmitting and receiving lines at each station, a circuit-breaker at each station interposed between the main line and the branch lines, the circuit-breaker at one station being actuated more rapidly than that at the other station, and telegraphic receiving apparatus, transmitting apparatus, and a battery in each of the branch lines, the two batteries at each station being arranged with opposite poles to the line, for the purpose set forth.

5. The combination of a main line, branch or transmitting and receiving lines at each end of the main line, a vibratory circuit-breaker at each station interposed between the main line and the branch lines, and means for vibrating the circuit-breakers at different speeds, for the purpose set forth.

6. The combination of a main line, branch or transmitting and receiving lines at each station, and a vibrating fork at each station, with a local-battery circuit and magnet for automatically vibrating it, which fork rapidly makes and breaks the circuit through each of the branch lines, the fork at one station being vibrated more rapidly than that at the other station.

7. The combination of a main line, branch lines at each station, a circuit-breaker at each station, which makes and breaks the main-line circuit with each of the branch lines, and a battery in each branch line, the two batteries at each end of the line being arranged with opposite poles to the line.

8. The combination of a main line, branch lines at each end of the main line, circuit-breakers at each station, which rapidly make and break the main-line circuit with each of the branch lines, the circuit-breaker at one station acting more rapidly than that at the other station, a relay or relays at each station in one or both of the branch lines, and means for preventing chattering on the sounder, liable to be caused by the vibratory current.

9. The combination of a main line, branch or transmitting and receiving lines at each end of the main line, a circuit-breaker interposed between the main and branch lines at each station, that at one station being actuated more rapidly than that at the other, and a relay, one or both of the branch lines at each station having a polarized sounder and split battery in its local circuit, and a transmitting key or keys at each station.

10. The combination, substantially as set forth, of a main line, branch or transmitting and receiving lines at each station, circuit-breakers actuated at different speeds interposed between the ends of the main line and the branch lines, a transmitting key, battery, and relay in each of the branch lines, and a polarized sounder, local circuit, and split battery for each relay.

11. The combination of the main line, the branch or transmitting and receiving lines at each end of the main line, telegraphic apparatus in said branch lines, a circuit-breaker at each station interposed between the main line and branch lines, so as to successively and rapidly make and break the circuit with said lines, the circuit-breaker at one station acting to make and break the circuit more rapidly than that at the other station, and condensers connected in the branch lines, for the purpose set forth.

In testimony whereof I have hereunto subscribed my name this 12th day of April, A. D. 1883.

PATRICK B. DELANY.

Witnesses:
EDWD. A. CALAHAN,
H. D. MUNSON.